Nov. 18, 1969 H. DAMIANO ET AL 3,479,466
COMMUNICATION SYSTEM WITH CONTROL SIGNAL DELAY MEANS
Filed Feb. 3, 1966 9 Sheets-Sheet 1

INVENTORS H. DAMIANO
L. C. RAINONE
BY R. C. Winter
ATTORNEY

Nov. 18, 1969 H. DAMIANO ET AL 3,479,466

COMMUNICATION SYSTEM WITH CONTROL SIGNAL DELAY MEANS

Filed Feb. 3, 1966 9 Sheets-Sheet 3

COMMUNICATION SYSTEM WITH CONTROL SIGNAL DELAY MEANS

Filed Feb. 3, 1966 9 Sheets-Sheet 5

Nov. 18, 1969 H. DAMIANO ET AL 3,479,466

COMMUNICATION SYSTEM WITH CONTROL SIGNAL DELAY MEANS

Filed Feb. 3, 1966 9 Sheets-Sheet 6

Nov. 18, 1969 H. DAMIANO ET AL 3,479,466

COMMUNICATION SYSTEM WITH CONTROL SIGNAL DELAY MEANS

Filed Feb. 3, 1966 9 Sheets-Sheet 9

3,479,466
COMMUNICATION SYSTEM WITH CONTROL SIGNAL DELAY MEANS

Henry Damiano, Keyport, and Louis C. Rainone, Matawan, N.J., assignors to Bell Telephone Laboratories, Incorporated, New York, N.Y., a corporation of New York Filed Feb. 3, 1966, Ser. No. 524,917
Int. Cl. H04m 3/00; H04j 3/16
U.S. Cl. 179—18 35 Claims

ABSTRACT OF THE DISCLOSURE

A communication system is disclosed in which the identities of lines establishing connections through a switching network are indicated by control signals transmitted through time multiplex channels in selected control paths common to all of the system lines. The line identities corresponding to the control signals are circulated in common control apparatus and utilized to interconnect lines engaged in communication through the switching network.

This invention relates to communication systems and more particularly to the manner of establishing monitoring call connections in such systems.

Typically, in communication systems, connections are established between calling and called stations by registering call information such as line identities in control equipment at some central location and then completing connections through a switching network based upon this stored information. In many commercial systems, e.g., panel and crossbar, the stored information is canceled upon completion of the call connection so that the various registration devices are freed for use on subsequent calls.

In a more recently developed systems a stored program controls the establishment and progress of call connections and maintains a record of the active lines until the talking parties break the connections. It is also used, for example, to control the operation of line gates in a time division multiplex switching network during the brief interval in each cycle in which two lines are interconnected via a common transmission bus. It is desirable to retain call information throughout the conversation for other reasons as well and thus such systems gain an advantage over the earlier types. However, the stored program approach, as presently contemplated, is expensive and consequently is feasible only in large common control systems.

The state of the art is such that this stored program approach is impractical for systems of approximately fifty lines or less, e.g., community dial offices or satellites of a large central office; and the advantages, such as supervision of the establishment of a call connection, switching in a time division multiplex system, call tracing, priority determination, billing identity, et cetera, which may be derived from retaining call information, currently are not available in systems of this size.

It is a general object of this invention to provide an improved communication system for serving relatively few subscriber lines.

It is another object of this invention to employ data storage and control techniques in small communication systems which will provide the advantages of stored program arrangements to such systems.

These and other objects of this invention are attained in one specific illustrative embodiment wherein a data exchange circuit comprising a memory, e.g., a recirculating delay line, is employed to store identity and control data for use in associating system lines with various control devices in order to supervise the establishment of call connections. Each line in the system, which for purposes of this description includes transmission and control lines and trunks, is assigned a discrete portion of the memory, termed a time slot hereinafter. The data stored in the memory in each time slot includes the designation of the particular line with which the assigned line is to be associated.

A clock is synchronized with the memory and serves to step the data through the memory in a repetitive cycle. Thus in each complete cycle of time slots, all of the data stored in the memory will have appeared at an output of the data exchange circuit. The clock also drives selection circuitry which directs a control signal to each line in sequence in the corresponding assigned time slots.

When first and second lines are to be associated with one another, e.g, a call register line is to be associated with a calling line to supervise the establishment of a connection of the calling line to a called line, the control equipment will preset the two lines to gate the control signal, arriving in the respective assigned time slots, to the data exchange circuit via a bus, designated the store-write bus, which is common to all lines. The data exchange circuit is arranged to store the designation of each of the two lines in its memory in the time slot assigned to the other line in response to receipt of the control signal from the store-write bus in the respective assigned time slots.

Thereafter, upon occurrence of the time slot assigned to a first one of the two lines, the designation of the other or second line will be retrieved from the memory and utilized to activate the second line. Such activation is permitted by the receipt from the first line of the control signal on another common bus, designated the supervisory bus. Upon activation of a line in this manner, various supervisory and control functions may be performed, e.g., provision of dial tone, storage of the called line designation, provision of busy tone, and connection to a called line. Each time a different line is to be associated with the calling line, the foregoing operations involving the data exchange circuit are repeated.

The advantage of this arrangement lies in its simplicity. Once an association has been established between two lines in this manner, it will be reestablished periodically with a minimum of control circuits involved. Furthermore, this arrangement is suitable for terminating either rotary dial pulsing stations or multifrequency pulsing stations, or both types simultaneously, with no variation in equipment requirements.

In accordance with one aspect of the invention, the data exchange circuit comprises a pair of registers to which each line designation is applied in the corresponding assigned time slots. The control signal arriving on the store-write bus will enable one of the registers to record the line designation corresponding to the time slot in which the control signal is received. The control signal will be received next in the time slot assigned to the line to be associated with the first line. In this latter time slot, the control signal will enable the storage of the second line designation in the other register and also will enable the insertion of the recorded first line designation in the memory. Thus the designation of a line to be associated with another line is stored in the memory in the time slot assigned to the other line.

In accordance with another aspect of the invention, the system clock is synchronized with the delay memory automatically once in each cycle of operation. A word counter identifies the line corresponding to each time slot as the data in the time slot is retrieved from the delay line. For this purpose the clock which steps the delay line through the sequence of time slots also steps the word counter at the same rate through the sequence of corresponding identifying words. A start pulse is inserted in the delay line at the outset of operation and circulates through the delay line until power is removed. When the word counter completes its count it inhibits further operation of the clock, the operation being reinitiated by the start pulse exiting the delay line.

It is a feature of this invention that a data exchange circuit circulate data which is stored therein in response to control signals received from system lines for supervising the establishment of line interconnections in the system.

It is another feature of this invention that each line be assigned a distinct time slot in a repetitive cycle in which it receives a control signal from the data exchange circuit and in which it returns the control signal to the data exchange circuit in order to activate a second line with which it is to be associated.

It is a further feature of this invention that the data exchange circuit respond to receipt of the control signal from the first line to store the designation of the second line in its memory in the time slot assigned to the first line.

It is yet another feature of this invention that the data exchange circuit respond to the subsequent receipt of the control signal from the first line in the corresponding assigned time slot to retrieve the designation of the second line from its memory and in response to such retrieval, to activate the second line.

It is a still further feature of this invention that the control arrangement accept rotary dial pulses or multifrequency pulses from the stations terminated thereon, without requiring applique circuits to accommodate either type of digit pulses, by utilizing the control path established by the data exchange circuit.

It is a feature in accordance with one aspect of the invention that the system clock be synchronized with the delay line memory in the data exchange circuit by an enabling pulse inserted in the delay line from an independent source, the clock being inhibited upon each completion of the count corresponding to the number of words circulating through the delay line and being restarted by the circulating enabling pulse.

It is a still further feature of our invention that the network connections for communication purposes can be made distinct from the connections for supervisory purposes, the latter being on a time division basis regardless of the nature of the network connections. Accordingly, a space division network may be employed for the communication connections and our time division supervisory arrangements utilized for the supervisory connections that must be established and monitored.

A complete understanding of this invention and of the above-noted and other features thereof may be gained from consideration of the following detailed description, with reference to the accompanying drawing, in which.

Figure 1A:
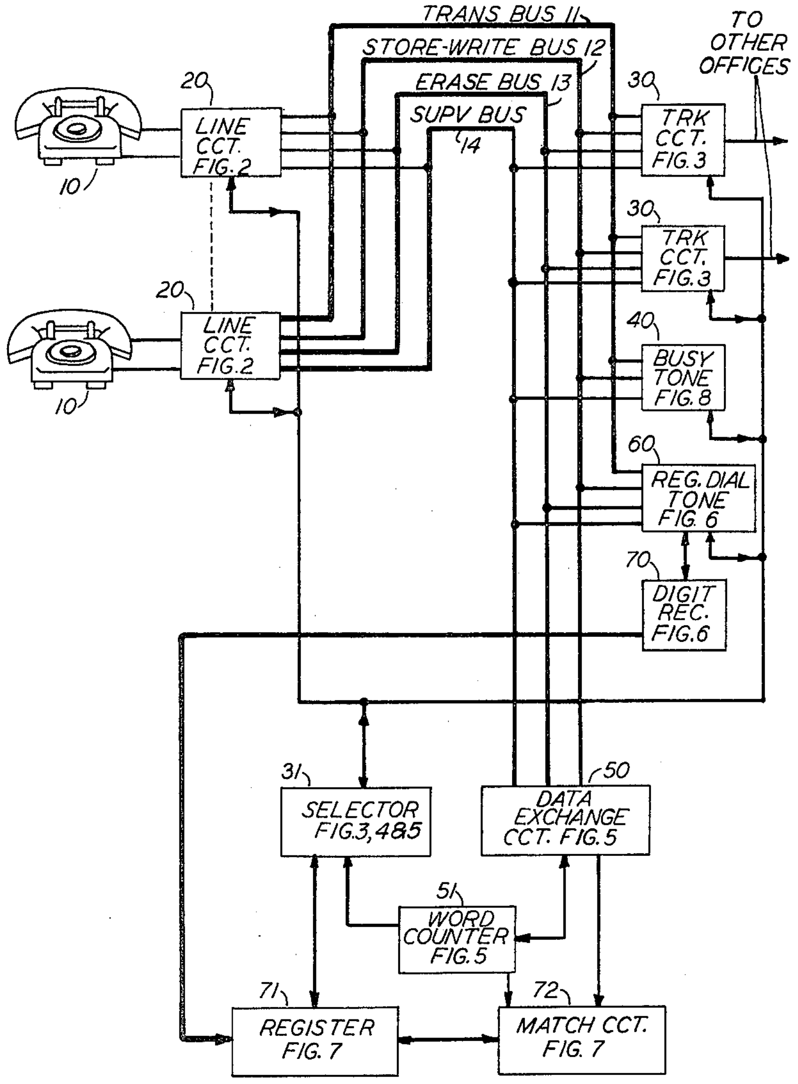
FIG. 1A is a simplified block diagram representation of one specific illustrative embodiment of the invention in a system utilizing a time division switching network.
Figure 1B:
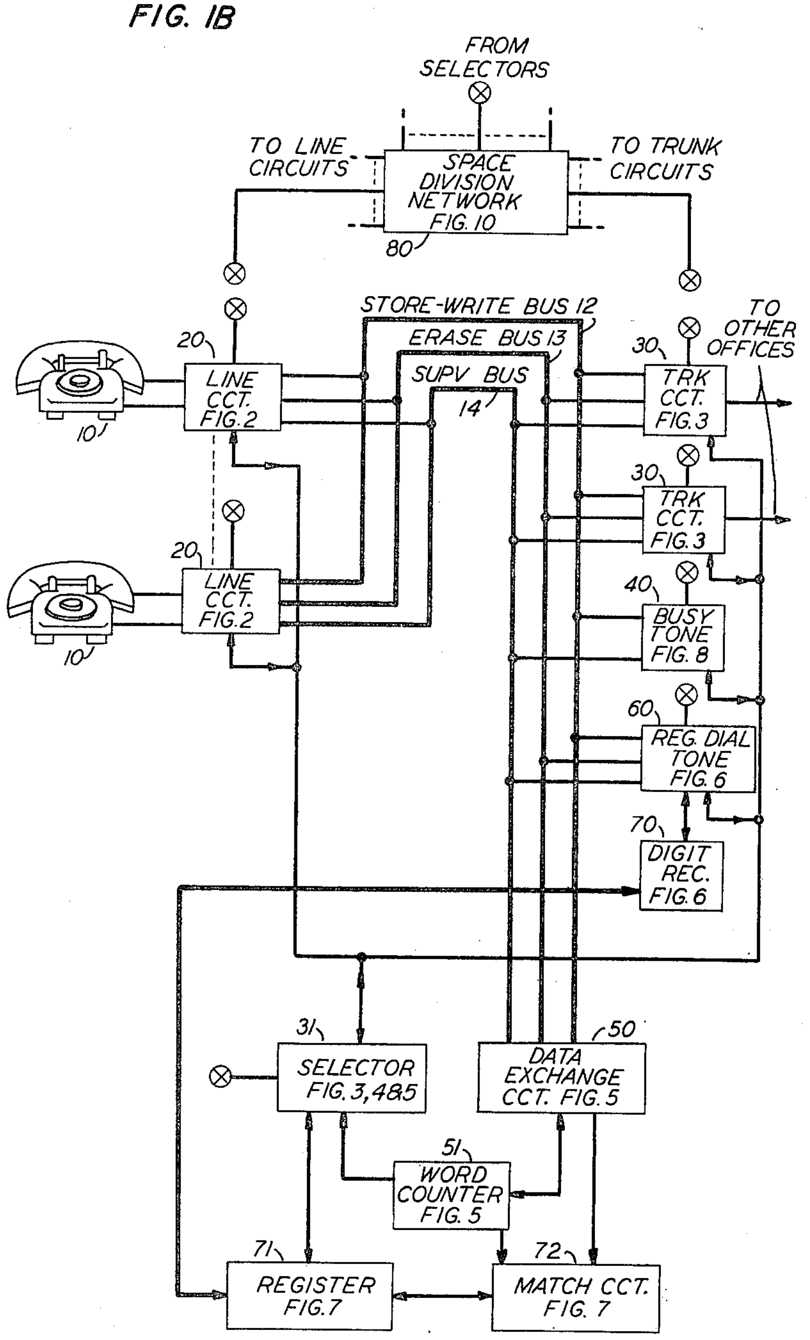
FIG. 1B is a representation of the embodiment of FIG. 1A in a system utilizing a space division switching network.
Figure 7:
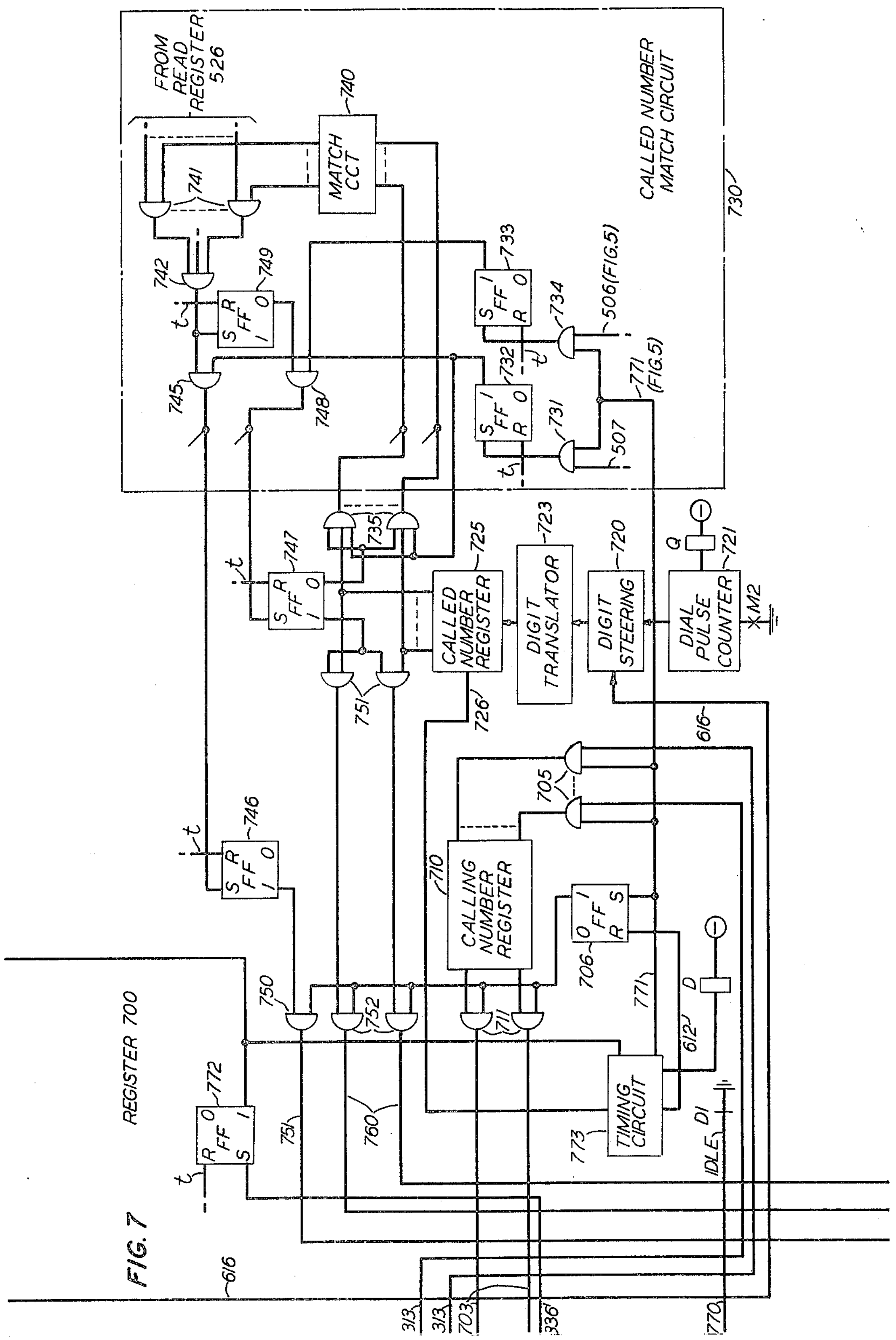
Figure 9:
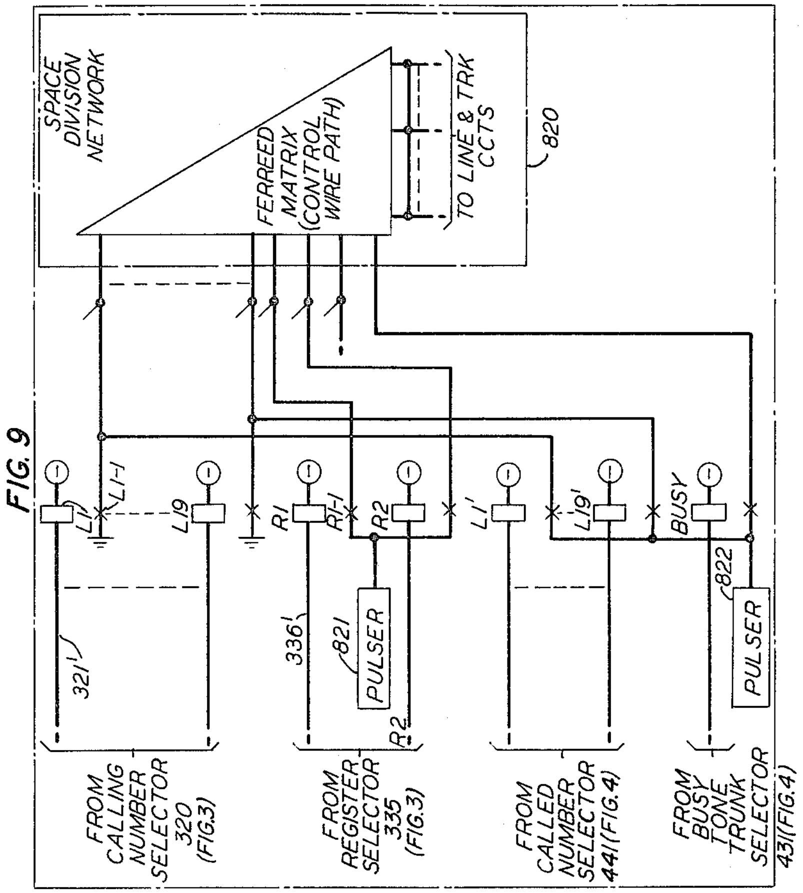
Figures 8, 10:
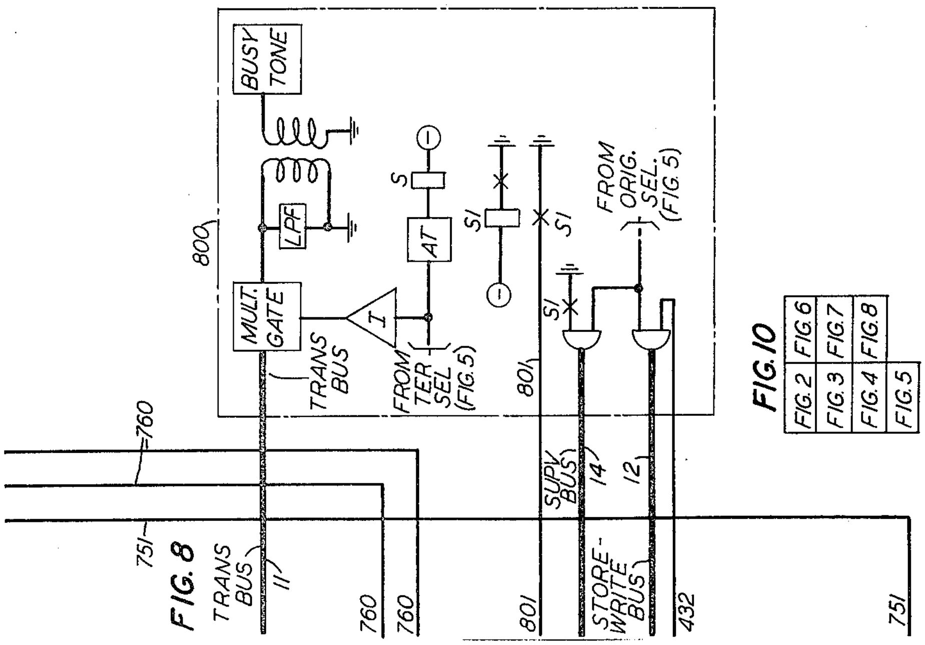

FIGS. 2 through 8 contain a more detailed representation, mainly in block diagram form, of the specific illustrative embodiment of FIG. 1A, the arrangement of FIGS. 2 through 8 being shown in the key diagram of FIG. 10; and FIG. 9 illustrates the network of FIG. 1B and its manner of connection to the control equipment.

It will be noted that a type of notation referred to as "detached contact" is employed in the drawing. In this notation an *x* represents a normally open relay contact, while a bar intersecting a conductor at right angles represents a normally closed relay contact. This type of notation is described in detail in an article entitled "An Improved Detached-Contact-Type Schematic Circuit Drawing" by F. T. Meyer in the September 1955 publication of the American Institute of Electrical Engineers Transactions, Communications and Electronics, vol. 74, pages 505–513.

THE SYSTEM

Turning now to the drawing, the basic elements of a telephone system illustrative of one specific embodiment of this invention are depicted in FIGS. 1A and 1B. As there seen, a plurality of telephones 10 are each connected through an individual line circuit 20 to a common transmission bus 11, FIG. 1A, in a time division switching network or, optionally, to a space division switching network 80, FIG. 1B. As will become apparent from the description hereinafter, the control arrangement in accordance with this invention is applicable to either type of switching network.

A plurality of trunk circuits 30 serve to connect the time or space division networks to other offices. The other circuits for transmitting or receiving various supervisory signals such as busy tone circuit 40, dial tone circuit 60 and digit receiver 70 are also connected to the transmission bus 11, FIG. 1A, in the time division network or, optionally, to the space division network 80, FIG. 1B. An example of a time division switching network suitable for this embodiment of the invention is disclosed in R. C. Gebhardt et al. Patent 3,225,144, issued Dec. 21, 1965. An example of a space division network is disclosed in T. N. Lowry application Ser. No. 205,920, filed June 28, 1962, now Patent 3,231,679 issued Jan. 25, 1966.

The control equipment for the system comprises the data exchange circuit 50 which contains the circuitry essential to performance of the data exchange operations providing the basic distinctions in this disclosure over other communication systems. Each system connecting component, such as line circuits, trunk circuits and registers, is assigned a specific designation, viz., a coded binary number, contained in the word counter 51 and has a corresponding space or time slot alloted to it in the data exchange circuit 50. When it is desired to communicate between any two system connecting components, selector circuit 31 and register circuit 71 cooperate with word counter 51 to insert the designation of one connecting component in the time slot of data exchange circuit 50 corresponding to the other component.

With this arrangement, data exchange circuit 50 provides an output in the time slot assigned to each of a pair of components in communication thereby permitting their interconnection during one or both of these time slots in each cycle of operation. For example, if it is desired to connect a telephone 10 to a trunk circuit 30, the designation of the trunk circuit 30 will be inserted in the time slot of data exchange circuit 50 assigned to the telephone 10 and vice versa.

If the time division switching network is utilized, the designation stored in data exchange circuit 50 will result in the simultaneous connection of the corresponding line circuit 20 and trunk circuit 30 to transmission bus 11, FIG. 1A, for a brief interval in each cycle of operation as required to perform a transfer of information accordance with time division principles. If the space division network is employed, the connection is established in identical manner but since a continuous connection is established between the line and trunk circuits throughout the conversation, the designation stored in data exchange circuit 50 referring to this conversation is only required upon origination and termination of the connection. However, the fact that it is available in data exchange circuit 50 throughout the conversation provides a distinct advantage in exchanging supervisory information, determining busy line conditions, tracing call connection, et cetera.

Thus if it is desired to detremine, for example, whether a particular line is busy on a call connection, the data exchange circuit 50 is interrogated during a complete cycle of operation in which the entire content passes through match circuit 72 where each stored designation is compared with the designation of the desired line circuit. If the comparison reveals a match, it is evident that the particular line is busy on another connection. Similarly, if it is desired to trace a call to determine the calling party when the identity of the called party is known, it is necessary merely to interogate the data exchange circuit in the time slot assigned to the called party, since the designation of the calling party will be found therein.

THE DATA EXCHANGE CIRCUIT

Figure 5:
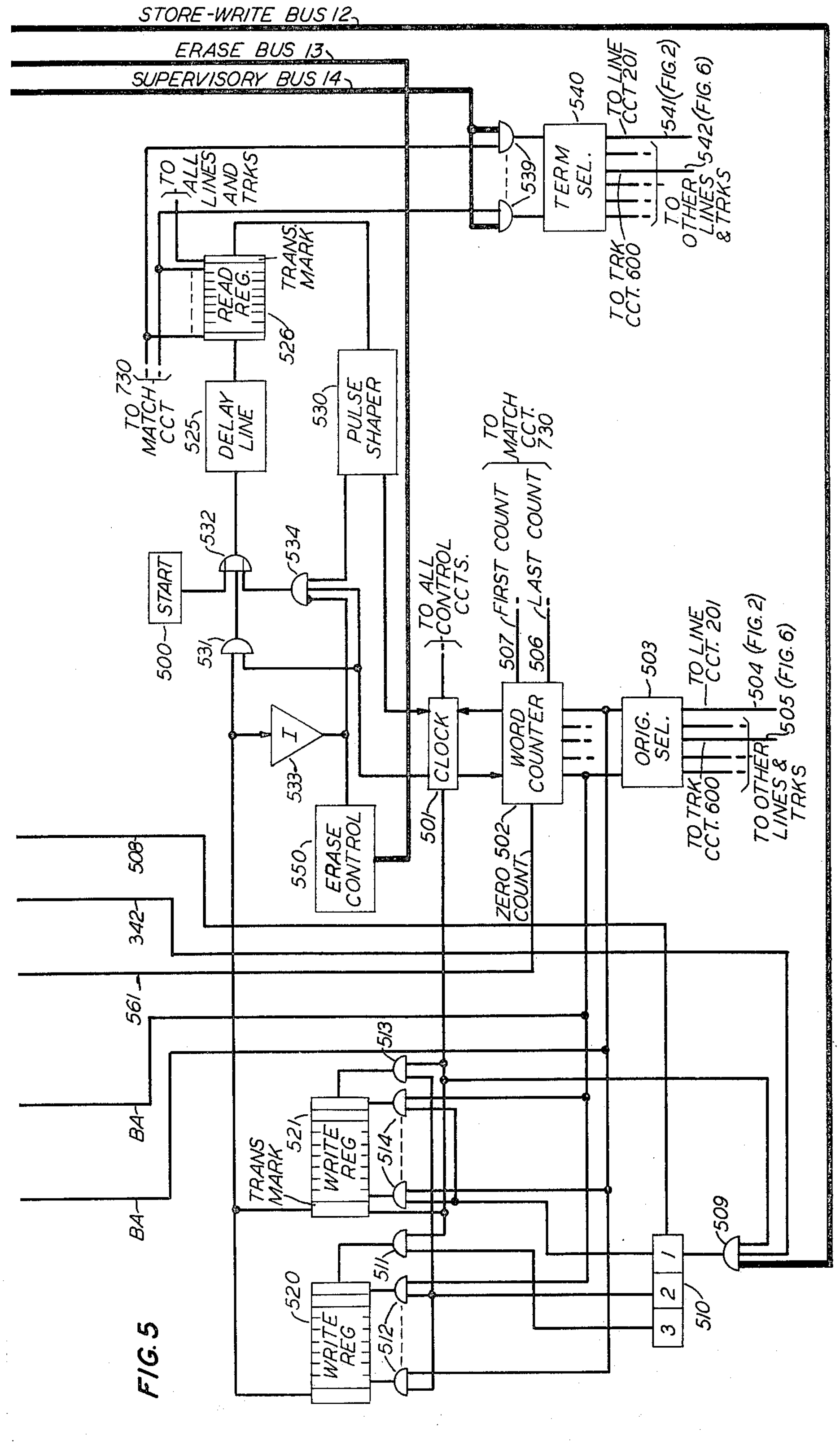
Figure 6:
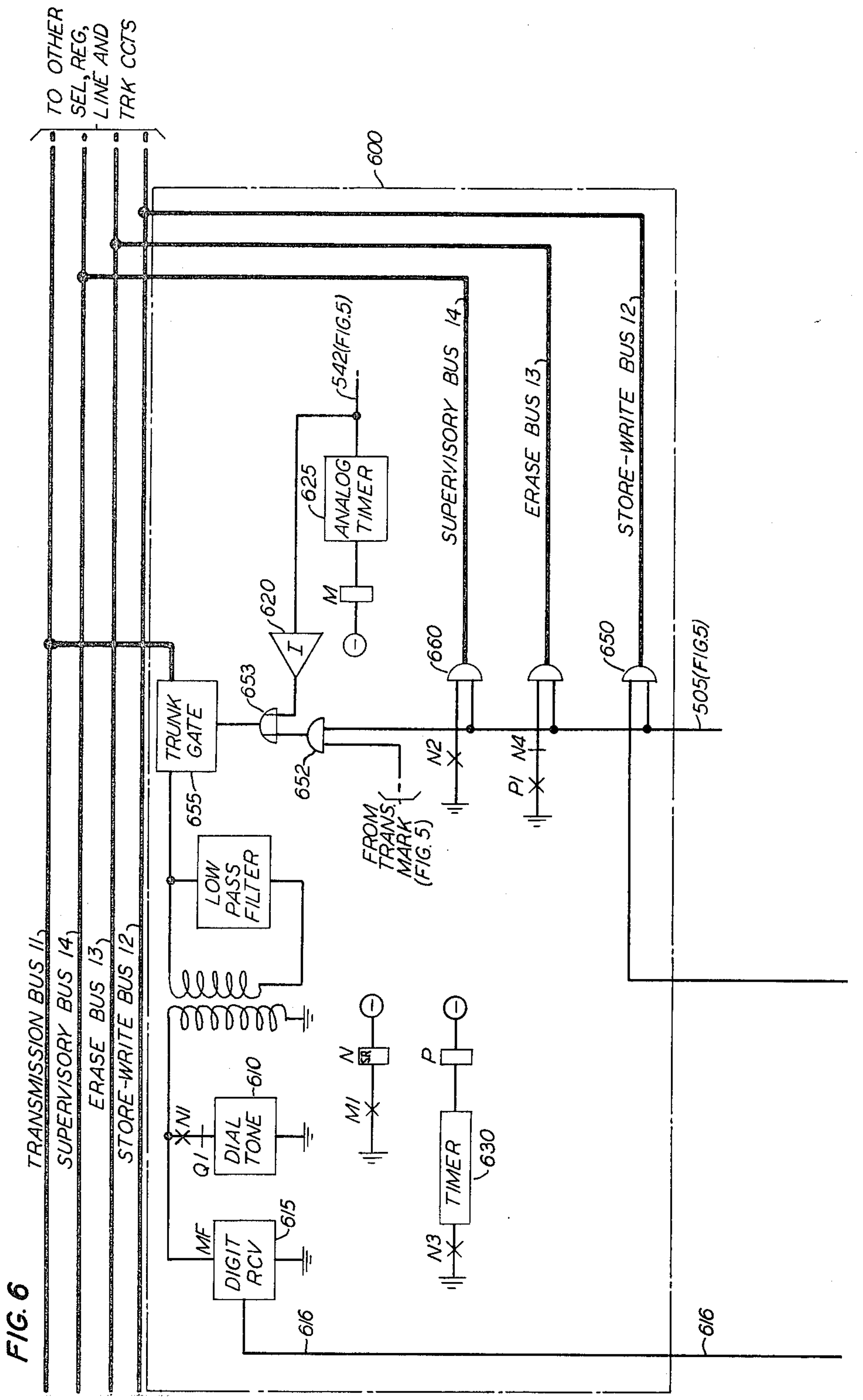

The elements of the data exchange circuit are depicted in FIG. 5. The principal element in this circuit is the circuit is the delay line 525, which may comprise a delay medium of wire, glass, quartz or aluminum onto which quartz crystal transducers are soldered. The input crystal transforms electrical energy to acoustical energy and initiates an acoustical wave. After traveling through the delay line, the acoustical wave falls upon the output crystal, where transformation to electrical energy takes place. A delay line suitable for this purpose is described in Patent 2,672,590, issued Mar. 16, 1954 to H. J. McSkimin, though other types of delay lines may be employed.

The sole function of delay line 525 is to remember which line, trunk or control circuit is connected to which other line, trunk or control circuit. The peripheral circuitry in the data exchange circiut is then utilized to determine the frequency of readout from the delay line to complete each system connection specified by the delay line.

It, no doubt, is apparent to the reader at this point that once having stored the calling and called line designations in the delay line, this information is available upon request by the system control for any desired purpose in addition to completion of the call connection. For example, if a call must be traced, the content of the time slot assigned to the called line is examined as it is recorded in read register 526 at the output of delay line 525. This content will provide the calling line designation immediately.

Additional delay lines may be operated in parallel with delay line 525 to store desired control information. Read register 526 then would be shared in time by the plural delay lines.

The data exchange circuit, as depicted in FIG. 5, consists of a closed loop into which pulses can be introduced, in which pulses can circulate for any desired length of time, and from which pulses can be selectively removed. The memory loop contains a reading point through which the pulses pass once per round trip and from which data for control of the various system components can be obtained.

The time of one round trip in the memory loop is an office cycle. The reciprocal of the office cycle represents the speech sampling frequency when a time division switching network is utilized; i.e., the rate at which lines and trunks are interconnected via the transmission bus 11. The sampling frequency must be at least twice the highest speech frequency which is to be transmitted without distortion. In the specific illustrative embodiment of this invention being described, utilizing a time division switching network, a 5 kilocycle transmission bandwidth dictates a 10 kilocycle sampling rate.

The data exchange circuit provides supervisory control for twenty-six system components. Thus twenty-six time slots are provided in the delay line, each of which stores 10 binary digits or bits for identification of the particular component; viz, a five-bit address, one bit for a transmission mark, to be described hereinafter, and four bits for control purposes. This particular arrangement will satisfy the requirements of a twenty line system, with two registers, two busy tone trunks, one spare and one common control. The delay line is operated at a 2.6 megacycle bit rate with a total loop delay of 100 microseconds.

SYSTEM TIMING

The function of clock 501, FIG. 5, is apparent. In a time division switchnig system all speech and control circuits operate during short intervals of time, and in order to obtain proper operation, all parts of the system must be accurately coordinated in time. This is done by actuating all circuits requiring accurate timing with signals from a common source. In accordance with this aspect of the invention, clock 501 operates on a start-stop basis. The entire system is operational only while clock 501 is active. A start signal generated by start circuit 500 is inserted in delay line 525. After the requisite delay, the start pulse will pass through read register 526 and pulse shaper 530 and will activate clock 501.

When the word counter 502 which is driven by clock 501 has completed its count, equivalent to the number of time slots in delay line 525, it will transmit a stop signal to clock 501. Since clock 501 controls the insertion of data in delay line 525, no further insertion are permitted, nor are control functions throughout the system permitted until the clock is again activated by the next start pulse received from the delay line.

Thus clock 501 is only required to maintain synchronization for the total interval of delay in delay line 525. The idle clock time will be utilized to make allowances for temperature and other variable effects in the delay line. In order to avoid the effect of noise pulses falsely activating clock 501, an appropriate code may be assigned to the start pulse.

ESTABLISHING A CALL CONNECTION—TIME DIVISION NETWORK

Having thus described the control circuits for interconnecting any two system components, the operation of the specific illustrative embodiment of this invention in establishing a connection between calling and called lines utilizing the time division switching network will now be considered. A connection may be established on request either of a subscriber in a distant office through the trunk circuits 30 or on request of a subscriber in this office through one of the line circuits 20. Since both types of requests, referred to as off-hook conditions, are treated in the same fashion by this control arrangement, the following discussion will consider a request originating from a local subscriber, in this instance station 200, FIG. 2.

The off-hook condition at station 200 operates relay A in line circuit 201, which relay, through its make contacts A1, enables relay B. Relay B, in operating, applies ground to timer 202 through contacts B1. Also flip-flop 203 is set through contacts B2, thereby applying an off-hook signal through lead 204 to scanner 301, FIG. 3.

Scanner 301 is arranged to step sequentially through all the line and trunk terminals seeking the active condition represented by a signal on the corresponding lead 204. The sequential stepping operation is performed by input control 302 in response to the address of each line and trunk circuit received in parallel binary form from word counter 502, FIG. 5. When the address provided through input control 302 corresponds to line circuit 201, scanner 301 will apply the signal on lead 204 to detector 303. This in turn serves to set flip-flop 304 which then inhibits gates 305 to stop the scanning operation at line circuit 201.

Detector 303 also starts timing circuit 310 and enables input controls 315 and 330. Input control 315 applies the binary representation of line circuit 201, received simultaneously from word counter 502, to calling number selector 320 and concurrently to calling number store 325. Input control 330 contains a counter which steps through the designations of all registers in sequence upon receipt of the signal from detector 303. An idle register 700 indicated by a signal on lead 770 will stop the counter in input control 330 and write the corresponding address in register selector 335.

In put controls 315 and 330 also provide outputs which enable AND gate 339 when a word zero signal appears on lead 561 from word counter 502. The output of AND gate 339 in turn enables write control circuit 340 to provide readouts from calling number selector 320 and register selector 335 during time slot zero. The calling number is translated in selector 320 and a signal applied to the corresponding output lead, in this instance lead 321. This signal sets flip-flop 210 in the calling line circuit 201, via OR gate 209. Flip-flop 210 in turn resets flip-flop 203 so as to remove the output signal currently being applied to scanner 301. The scanner 301 is thus free to initiate a new scan.

The output of register selector 335, in this instance on lead 336, sets flip-flop 772 in register 700, FIG. 7. The output of flip-flop 772 in the set state activates timing circuit 773 so as to enable relay D and energize start lead 771. Relay D, in operating, actuates break contacts D1, thereby removing the idle signal from lead 770. Thus register 700 is placed in the busy condition and will not be available for assignment to other calls.

The signal on start lead 771 enables AND gates 705 to transfer the calling number from store 325 to register 710. The signal on lead 771 also sets flip-flop 706 to permit the registered calling number to be transferred through AND gates 711 and input control 401 to its counterpart calling number selector 405 in the completion circuit of FIG. 4.

Calling number selector 405 translates the designation of the calling line currently contained therein and applies a signal over lead 421 and through OR gate 209 to the set input of flip-flop 210. Flip-flop 210 was previously set by the output of selector 320, so that this action serves a holding function to prevent the output of flip-flop 203 from again engaging scanner 301. Thus selector 320 is freed for employment on another call. The set output of flip-flop 210 also activates lead 221, partially enabling AND gate 230.

Figure 2:
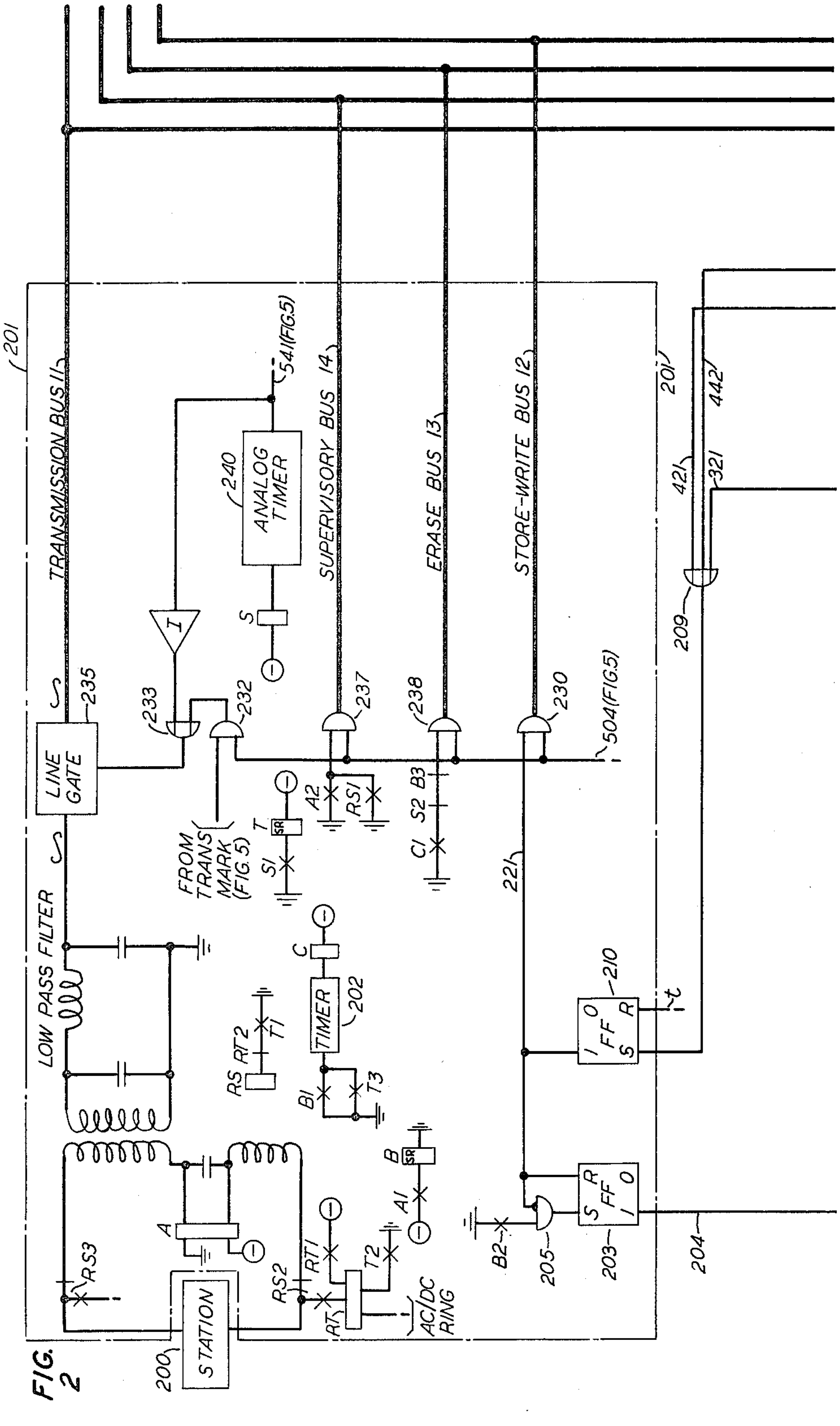
Figure 3:
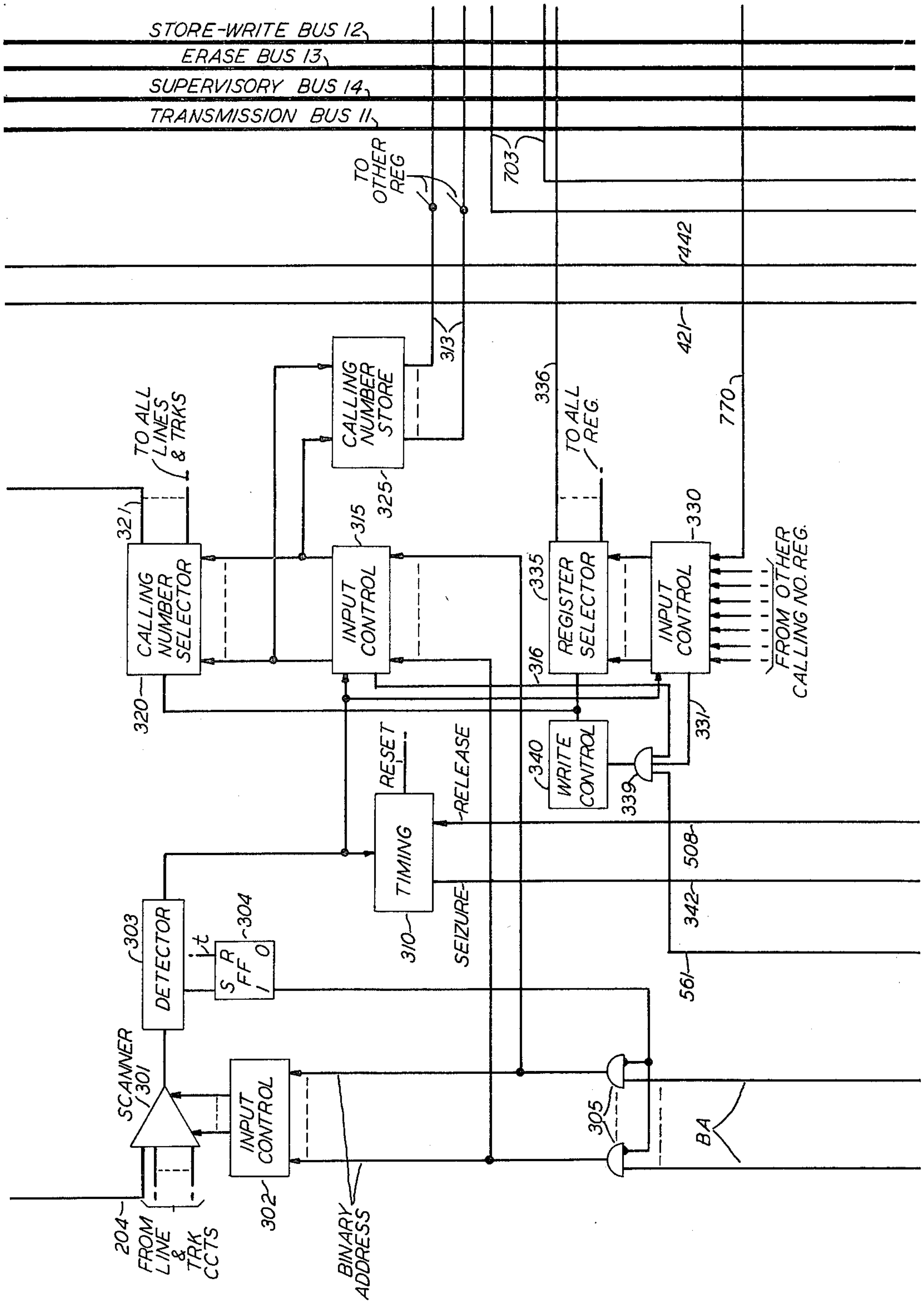
Figure 4:
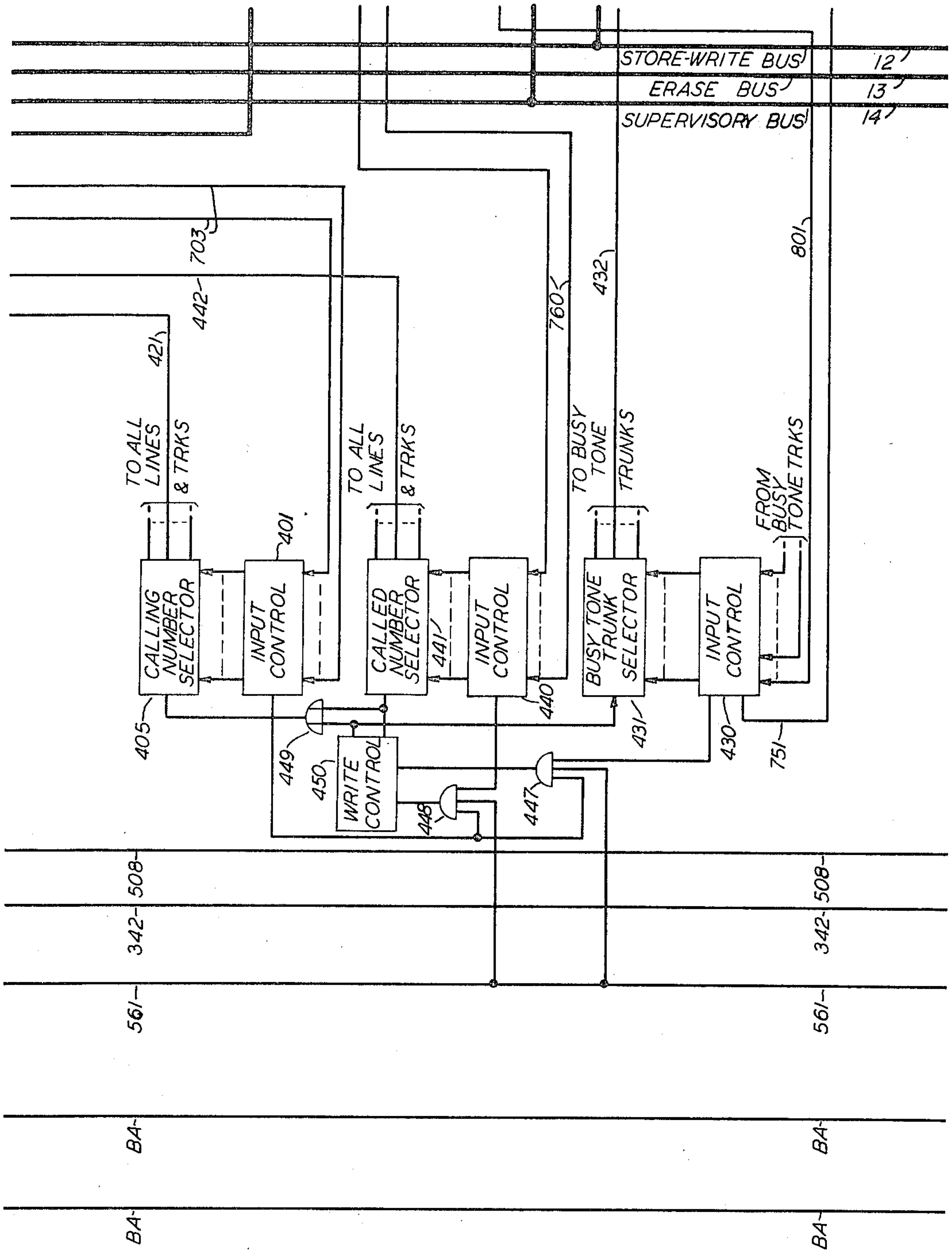

Timing circuit 310, FIG. 3, responds to the output of detector 303 to apply a signal over lead 342 to one input of AND gate 509, FIG. 5. Timing circuit 310 may, for example, be a simple flip-flop receiving its set input from detector 303, its reset input from register 510 on lead 508, and having its set output on lead 342 and its reset output on the RESET lead. Word counter 502, FIG. 5, also applies the designation of line circuit 201 to originating selector 503 which translates this designation and applies a signal via lead 504 to a plurality of AND gates in line circuit 201, FIG. 2, including AND gate 230. With AND gate 230 enabled, a signal is transmitted via the store-write bus to AND gate 509, FIG. 5. This signal, coupled with the outputs of clock 501 and timing circuit 310, enables shift register 510 to control the storage of the calling station 200 designation in delay line 525.

The first time shift register 510 is enabled, an output signal is taken from the first stage thereof which serves to enable AND gate 514 to store the current content of word counter 502, designating calling station 200 and its corresponding line circuit 201, in write register 521.

Originating selector 503 continues to sequence through the lines, trunks and registers in response to changes in the word counter 502 until register 700, assigned to the calling line is selected via lead 505. AND gate 650 is thus enabled and transmits a signal via the store-write bus to AND gate 509, the latter gate again being enabled in conjunction with the signal from timing circuit 310 and clock 501 to shift the activity condition of register 510 to the second stage. The second stage output of register 510 serves to enable AND gates 512 so as to store the current content of word counter 502, designating register 700, in write register 520.

Concurrently, AND gate 513 is enabled by the output of the second stage of register 510 and a signal from clock 501 to load the content of write register 521 in delay line 525 via AND gate 531 and OR gate 532. These data signals are also transmitted through inverter 533 to an inhibit input of AND gate 534. In this fashion the new data will erase the data currently circulating in delay line 525 in this time slot. The net effect of the preceding operations is to store the designation of calling line circuit 201 in the time slot assigned to register 700.

Originating selector 503 continues to cycle through all lines and trunks until lead 504 to calling line circuit 201 is once again activated. Another signal on the store-write bus from AND gate 230 is thus received at AND gate 509 so as to advance the activity condition of register 510 to its third position. An output from the third position of register 510 in conjunction with timing signals from clock 501 enables AND gate 511 to shift the data stored in write register 520, designating register 700, in sequence into delay line 525 where it will occupy the time slot assigned to calling station 200. This sequence completes the storage operation necessary to the establishment of a connection between calling station 200 and register 700 in each succeeding cycle of operation. The output of register 510 is also utilized after a short delay to reset itself and to release timing circuit 310 via lead 508 so as to reset all flip-flops having a reset input designated *t*.

It is possible to provide this connection twice per cycle since the essential data is now stored in two time slots of delay line 525. However, for purposes of voice transmission in the system in this illustrative embodiment of the invention, only one connection per cycle is required. Thus a transmission mark is stored in the first position of write register 521 by clock 501, but this transmission mark is purposely omitted from write register 520.

Upon readout of the data stored in each time slot of delay line 525 into register 526, the transmission mark, if present, is directed to all line and trunk circuits simultaneously, where it assists in enabling the corresponding transmission gate. In this example the transmission mark appears in delay line 525, coupled with the designation of station 200 in the time slot assigned to register 700. In this position the transmission mark serves to establish a solid connection between station 200 and register 700 during the time slot assigned to register 700. However, since the transmission mark is not coupled with the designation of register 700 appearing in delay line 525 in the time slot assigned to station 200, such a solid connection will not be established during this time slot. The foregoing sequence of events may be observed in the following detailed description.

Consider, first, that the time slot assigned to register 700 has just arrived. Thus word counter 502 will contain the designation of register 700 and concurrently read register 526 will contain the designation of station 200 plus the transmission mark. Originating selector 503 will translate the designation of register 700 received from word counter 502 and transmit a signal on lead 505 to trunk circuit 600 where it will enable AND gate 660 in conjunction with the ground signal through operated make contacts N2. The resultant output of AND gate 660 on the supervisory bus enables gates 539 to transfer the designation of station 200 from read register 526 to terminating selector 540. This designation is translated and the resultant signal applied over lead 541 to OR gate 233, the output of which enables line gate 235. Concurrently, the transmission mark is applied by read register 526 to all lines and trunks including register trunk 600. AND gate 652 is enabled upon the simultaneous receipt of the transmission mark and the signal from originating selector 503 on lead 505 and its output is applied through OR gate 653 to enable trunk gate 655. The foregoing sequence thus establishes the desired solid connection between station 200 and register 700 in the time slot assigned to the register 700.

In the time slot assigned to station 200, word counter 502 will contain the designation of station 200 and read register 526 will contain the designation of register 700 without the transmission mark. Thus originating selector 503 will apply a signal via lead 504 to line circuit 201 where it serves to enable AND gate 237 to signal via the supervisory bus to AND gates 539. Terminating selector 540 translates the designation of register 700 received from read register 526 through AND gates 539 at this time and signals via the corresponding lead 542 to enable trunk gate 655 through inverter 620 and OR gate 653. However, line gate 235 will not be enabled at this time since transmission mark is not available to enable AND gate 232 in conjunction with the signal from originating register 503 on lead 504.

The station 200—register 700 connection will be maintained until registration of the called line digits has been completed, physical connection bieng established between station 200 and register 700 once in each cycle of operation during the time slot assigned to register 700.

This sequence of events also serves to apply dial tone to the calling station. Thus the signal on lead 542 to trunk circuit 600 begins the operation of analog timer 625 and enables relay M. Timer 625 assures that relay M is maintained in the operated condition during the interval between cyclic appearances of the same time slot. Relay M in turn operates relay N through contacts M1. With relay N operated, dial tone generator 610 in trunk 600 will be connected to station 200 via contacts N1 during the time slot assigned to station 200.

REGISTERING THE CALLED LINE DESIGNATION

The party at station 200, upon receipt of dial tone, proceeds to dial or otherwise designate the called line to the control equipment. If multifrequency signaling is employed, the digit signals are transmitted from station 200 to receiver 615 via the transmission bus in each succeeding appearance of the time slot assigned to the calling line. Receiver 615 in turn transmits the converted MF pulses to digit steering circuit 720 via lead 616.

If a rotary dial is employed, relay A in line circuit 201 will follow the dial pulsing at station 200, and contacts A2 will cause transmission of digit signals over the supervisory bus to AND gates 539 in each time slot assigned to the calling line. As a result relay M in trunk circuit 600 will be operated via lead 542 from terminating selector 540 and thus will follow the operation of relay A. Dial pulse counter 721 is activated upon operation of make contacts M2 and serves to repeat the appropriate digit pulses.

The first step by dial pulse counter 721 also enables relay Q, which in turn disables dial tone generator 610 at break contacts Q1, thus removing dial tone from the calling line upon receipt of the first digit in the called line designation.

The outputs from receiver 615 or dial pulse counter 721 are directed through digit steering circuit 720, translated into binary form in digit translator 723 and stored in proper form in called number register 725. It is evident that if a signal representing the digit zero is received from either digit receiver 615 or dial pulse counter 721, the signal transmitted through digit steering circuit 720 at this time will be translated into a binary code designation of the digit zero by translator 723 for subsequent registration in the called number register 725. A similar operation will result in the registration of the digit "one" in binary form in called number register 725 upon receipt of the distinctive "one" signal from either digit receiver 615 or dial pulse counter 721. In this fashion the entire called number will be registered in due course in called number register 725 irrespective of the type of station source involved.

CALLED LINE BUSY

It is now necessary to determine whether or not the called line is busy. To accomplish this it is only necessary to compare the called number as now contained in register 725 with that of the numbers currently being circulated through delay line 525, indicating that they are active on call connections. For this purpose called number match circuit 730, FIG. 7, is activated. This is accomplished by timing circuit 773 which enables AND gate 731 via lead 771 in conjunction with a signal from word counter 502 on lead 507 indicating the first count corresponding to the first time slot. The output of AND gate 731 sets flip-flop 732, which in turn enables AND gates 735. The content of match circuit 740 thus appears at AND gates 74 concurrently with the content of each time slot in delay line 525 as received in match circuit 730 from the read register 526 at the output of delay line 525.

If a match occurs, indicating a busy line, an output will be provided by AND gate 742 which, when coupled with the output of flip-flop 732, will enable AND gate 745 to set flip-flop 746. The outputs of flip-flops 706 and 746 in the set state serve to enable AND gate 750, which in turn activates input control 430 via lead 751. Upon activation of input control 430, the busy tone trunk designations are cycled therethrough until an available trunk is found, such as busy tone trunk 800, the idle condition of which is indicated by ground on lead 801. The designation of trunk 800 thereupon is inserted in busy tone trunk selector 431. The calling number was stored in calling number selector 405 when flip-flop 706 was set by timing circuit 773 via lead 771. The set output of flip-flop 706 in turn enabled AND gates 711 to transfer the content of calling number register 710 to calling number selector 405. Thus an output from each of input controls 430 and 401 is received at write control 450 through AND gate 447 at this time. Write control 450 responds to this input by activating selectors 405 and 431, the former through OR gate 449.

The output of calling number selector 405 via lead 421 and AND gate 209 will set flip-flop 210 in calling line circuit 201 such that upon the next appearance of the calling line designation in word counter 502, originating selector 503 will provide a signal via lead 504 to enable AND gate 230 in line circuit 201, and a signal will be transmitted via the store-wide bus to activate shift register 510 through AND gate 509. This action will initiate the operation of the writing circuitry, as described hereinbefore, which will ultimately lead to the identity of calling station 200 being stored in the time slot assigned to busy tone trunk 801 and vice versa. Thus upon the next appearance of the time slot assigned to calling station 200, a busy tone will be transmitted from busy tone trunk 801 to station 200 via the transmission bus.

CALLED LINE IDLE

If a match does not occur, indicating that the called line is idle, the last count registered in word counter 502 will set flip-flop 733 via lead 506 and AND gate 734. This action will direct a signal to one input of AND gate 748. Flip-flop 749 fails to receive an input from AND gate 742 throughout the count sequence, thereby remaining in the reset state and permitting AND gate 748 to be enabled. Flip-flop 747 is set by the output of AND gate 748 and in turn enables AND gates 751 to transmit the called number contained in register 725 to AND gates 752, the latter gates being enabled by flip-flop 706 in the set state to transmit the called number via leads 760 to input control 440. Input control 440 in turn transmits the called number designations to called number selector 441. Outputs of input controls 401 and 440 now enable write control 450 via AND gate 448, thereby activating calling number selector 405 and called number selector 441 upon the next appearance of word zero in counter 502.

This in turn will initiate actions resulting in the called number being registered in the time slot assigned to the calling number and vice versa. Such a connection between the calling and called lines or between the calling line and busy tone trunk corresponds to the connection established between the calling line and register trunk 600, as described hereinbefore.

RINGING THE CALLED LINE

When the called line is found to be idle, the control circuitry applies ringing signal to the corresponding station. Considering for the moment that line circuit 201 in FIG. 2 is connected to the called station, a signal from terminating selector 540, FIG. 5, is received via lead 541 at analog timer 240, FIG. 2, in the time slot assigned to the calling line. This signal operates relay S which in turn operates relay T through make contacts S1. Relay T in turn, through its make contacts T1, operates ringing start relay RS and, through its make contacts T2, applies ground to ringing trip relay RT. Relay RS closes a ringing path through the called station at its transfer contacts RS2 and RS3. At this point the ringing signal is applied to the called station. Since the called number is registered in the time slot assigned to the calling line, similar operations will occur in the calling line circuit. However, with the line loop already closed, the RT relay will operate before ringing signal can be applied. A capacitor across the break contact on transfer contacts RS2 will permit the application of a small portion of the ringing signal to the calling line to serve as a ringback tone.

Upon answer by the called station, ringing trip relay RT is operated and locked through contacts RT1. The ringing signal is removed from the line and the called station is put in a talking condition upon actuation of break contacts RT2, which restores relay RS and its transfer contacts RS2 and RS3 to normal. The A relay in the called station line circuit now operates, followed by operation of relay B through contacts A1. This would normally result in the setting of flip-flop 203 to indicate to scanner 301 that a request for service is being made by this line. However, since flip-flop 210 was previously set by the called number selector via lead 442, the set output of flip-flop 210 will inhibit the setting of flip-flop 203 at inhibit gate 205.

DISCONNECT

When the called party hangs up, the signal normally received from terminating selector 540 in the time slot assigned to the called line will not appear on lead 541 in the calling line circuit 201. Relay S, FIG. 2, releases, thereby releasing relay T at make contacts S1. The calling party, upon hang-up, restores relay A which in turn rstores relay B. At this point a pulse is transmitted over the erase bus through AND gate 238 upon receipt of a signal from originating selector 503 via lead 504 in the time slot assigned to the calling line. AND gate 238 is enabled by a signal at its other input from ground through operated make contacts C1 and restored break contacts S2 and B3. Relay C is released upon time-out of timer 202, which is provided to maintain relay C operated until the erase pulse has been transmitted. The erase pulse is received by erase control circuit 550, FIG. 5, via the erase bus and serves to provide a series of inhibit signals at AND gate 534 which prevent the called line designation currently appearing in the time slot assigned to the calling line from being reinserted in delay line 525.

A similar operation occurs in the called line circuit, resulting in erasure of the calling line designation from the time slot assigned to the called line. This erase operation is only required to prevent any spurious gate operations in the time division network subsequent to a call disconnect. The erasure of trunk and register designations from the delay line is performed in the same manner.

ESTABLISHING A CALL CONNECTION—SPACE DIVISION NETWORK

The operations involved in establishing a call connection utilizing the space division network parallel the operations described for the time division network with the exceptions to be considered hereinafter. For the purposes of this description, as illustrated in FIG. 9, a space division network utilizing ferreed crosspoints will be utilized. Thus the operation is identical through the selection of the calling line and the register 700. In this instance output lead 321' of the calling number selector 320 will permit the calling number selector to operate the corresponding L relay in FIG. 9, in this instance relay L1. Relay L1 in turn operates its corresponding make contacts L1–1 to complete a connection in one coordinate of the space division network 820.

Similarly, the selected idle register 700 will produce an appropriate output from register selector 335, FIG. 3, on lead 336' to operate the corresponding relay R, FIG. 9, in this instance relay R1. Relay R1 in turn operates its make contacts R1–1 to complete a path from ground at contacts L1–1 through the control wire path of network 800 to pulser 821. A signal from pulser 821 now operates the appropriate ferreed switches to complete a transmission path between the calling line and the register 700.

This network connection need not be released upon completion of the call since the ferreed crosspoint is disconnected automatically in the process of establishing new connections. Network connections between the calling line and a called line or a busy tone trunk are completed in a similar manner through the corresponding control circuits of FIG. 4 as they connect to the space division network 820, FIG. 9, via the corresponding line and busy relays.

It is to be understood that the above-described arrangement is illustrative of the application of the principles of the invention. Numerous other arrangements may be devised by those skilled in the art without departing from the spirit and scope of the invention.

What is claimed is:

1. A communication system comprising a plurality of lines each assigned to a different time slot in a repetitive cycle, and control means operating on a time division multiplex basis to complete call connections among said lines through a space division switching network, said control means comprising line selection means for applying a control signal to each of said lines in said corresponding assigned time slots of each repetitive cycle of time slots, a data exchange circuit, means for presetting first and second ones of said lines to transmit said control signal to said data exchange circuit in the respective assigned time slots, means responsive to receipt of said control signal in the time slot assigned to said first line for storing the designation of said second line in said data exchange circuit, and means operative upon retrieval of said second line designation from said data exchange circuit during said first line time slot for activating said second line.

2. A communication system in accordance with claim 1, wherein said second line comprises a source of dial tone and means operative in response to activation of said second line for connecting said dial tone source to said first line.

3. A communication system in accordance with claim 1, wherein said second line comprises means operative in response to activation of said second line for recording the designation of a called line provided by said first line.

4. A communication system in accordance with claim 3, wherein dial pulsing stations terminate one group of said lines and multifrequency stations terminate another group of said lines, and wherein said recording means comprises means for transmitting the designation of the called line from a calling multifrequency pulsing station via a first path and means for transmitting the designation of the called line from a calling dial pulsing station via said data exchange circuit upon successive activations of said second line.

5. A communication system in accordance with claim 1, wherein a third one of said lines comprises a source of busy tone and further comprising means operative upon detection of a match between the designation of a called one of said lines recorded in said second line and any one of the designations stored in said data exchange circuit for storing the designations of said third line in said data exchange circuit in the time slot assigned to said first line, means operative upon retrieval of said third line designation from said data exchange circuit in the time slot assigned to said first line for activating said third line, and means operative in response to activation of said third line for connecting said busy tone source to said first line.

6. A communication system in accordance with claim 1, wherein said data exchange circuit comprises memory means, register means, means responsive to receipt of said control signal in said second line time slot for recording the designation of said second line in said register means, and means responsive to receipt of said control signal during the next occurrence of said first line time slot for inserting said second line designation in said memory means.

7. A communication system in accordance with claim 1, wherein said control signal applying means comprises means for generating pulses defining the time slots in said repetitive cycle, line selecting means for directing a control signal to a designated one of said plurality of lines, and means responsive to pulses from said pulse generating means for applying the designations of each of said plurality of lines to said line selecting means in sequence during the corresponding assigned time slots.

8. A communication system comprising a plurality of lines, a bus common to said lines, a space division switching network and network control means operating on a time division multiplex basis to complete connections through said network between calling and called ones of said lines, said network control means comprising a data exchange circuit connected to said common bus, a selector circuit for generating a control signal, means for connecting a calling line and a second one of said lines to said common bus during corresponding assigned time slots of repetitive cycle to transmit said control signal to said data exchange circuit, means responsive to receipt of said control signal from said common bus in the time slot assigned to said calling line for storing the designation of said second line in said data exchange circuit, means for retrieving said second line designation from said data exchange circuit during each cyclic occurrence of said calling line time slot and means operative upon retrieval of said second line designation from said data exchange circuit for activating said second line.

9. A communication system comprising a plurality of lines each assigned to a different time slot in a repetitive cycle, a bus common to said lines, a data exchange circuit connected to said common bus, a selector circuit for generating a control signal, means for connecting a calling line and a second one of said lines to said common bus during said corresponding assigned time slots of a repetitive cycle to transmit said control signal to said data exchange circuit, means responsive to receipt of said control signal from said common bus in the time slot assigned to said calling line for storing the designation of said second line in said data exchange circuit, means for retrieving said second line designation from said data exchange circuit during each cyclic occurrence of said calling line time slot and means wherein said data exchange circuit comprises memory means, a pair of designation registers, means responsive to receipt of said control signal from said common bus in said calling line time slot for recording the designation of said calling line in one of said pair of designation registers, means responsive to receipt of said control signal from said common bus during the next appearance of said second line time slot for inserting the recorded designation of said calling line in said memory means and for recording said second line designation in the other one of said pair of designation registers, and means responsive to receipt of said control signal from said common bus during the next appearance of said calling line time slot for inserting the recorded designation of said second line in said memory means.

10. A communication system in accordance with claim 9, wherein said activating means comprises a supervisory bus common to said plurality of lines, line selecting means, means for applying an activating signal to the line designated by said line selecting means, means enabled by a control signal on said supervisory bus for transferring said second line designation from said data exchange circuit to said line selecting means, and means for connecting said calling line to said supervisory bus during the corresponding assigned time slot to apply said control signal to said supervisory bus.

11. A communication system in accordance with claim 9, further comprising a transmission bus common to said plurality of lines and means operative upon each retrieval of said second line designation from said data exchange circuit for connecting said calling line to said second line via said transmission bus.

12. A communication system in accordance with claim 9, further comprising an erase bus common to said plurality of lines and terminated on said data exchange circuit, means for connecting said lines to said erase bus in the corresponding assigned time slots, and means responsive to receipt of said control signal from one of said lines via said erase bus for erasing the designation stored in said data exchange circuit in the time slot assigned to said one of said lines.

13. A communication system comprising a plurality of lines, a plurality of trunks and means for engaging a selected one of said trunks to supervise the establishment of a connection between calling and called ones of said lines comprising means for applying a control signal to each of said lines and trunks in sequence in corresponding assigned time slots of a repetitive cycle, a data exchange circuit comprising memory means, and means for presetting said calling line and said seelcted trunk to transmit said control signal to said data exchange circuit in the respective assigned time slots, said data exchange circuit comprising means responsive to receipt of said control signal in the selected trunk time slot for recording the identity of the selected trunk and means responsive to receipt of said control signal in the calling line time slot for inserting the recorded trunk designation in said memory means.

14. A communication system in accordance with claim 13, further comprising means for retrieving the trunk designation from said memory means during each cyclic occurrence of the calling line time slot and means operative upon retrieval of said trunk designation from said memory means for enabling said selected trunk to apply dial tone to said calling line.

15. A communication system in accordance with claim 14, further comprising means for retrieving said trunk designation from said memory means during each cyclic occurrence of the calling line time slot and means operative upon retrieval of said trunk designation from said memory means for enabling said selected trunk to record the digits designating said called line provided by said calling line.

16. A communication system comprising a plurality of lines, a plurality of trunks, and means for establishing a connection between a calling one of said lines and a selected one of said trunks to register the designation of a called one of said lines comprising means for assigning a distinct time slot in a repetitive cycle of each of said lines and trunks, means for applying a control signal to each of said lines and trunks in sequence in the corresponding assigned time slots, a data exchange circuit comprising memory means, means for presetting said calling line and said selected trunk to transmit said control signal to said data exchange circuit in the respective assigned time slots, said data exchange circuit comprising means responsive to receipt of said control signal in the calling line time slot for recording the identity of the calling line and means responsive to receipt of said control signal in the selected trunk time slot for inserting the recorded calling line designation in said memory means, means for retrieving the calling line designation from said memory means during each cyclic occurrence of the selected trunk time slot, and means operative upon retrieval of the calling line designation from said memory means for interconnecting said calling line and said selected trunk.

17. A communication system in accordance with claim 16, further comprising means operative upon detection of a match between the called line designation recorded in said selected register trunk and one of the designations stored in said memory means for selecting one of said plurality of trunks containing means for generating busy tone, means operative in the next appearance of the calling line time slot for inserting the designation of the selected busy tone trunk in said memory means, means for retrieving said busy tone trunk designation from said memory means during each cyclic appearance of the calling line time slot and means operative upon retrieval of said busy tone trunk designation from said memory means for enabling said selected busy tone trunk to apply busy tone to said calling line.

18. A communication system comprising a plurality of lines, a space division switching network, transmission means, and time division multiplex means for establishing a connection between a pair of said lines through said network via said transmission means comprising delay means circulating information in a repetitive cycle of time slots, each time slot being assigned to a corresponding one of said lines, means connected to said delay means for applying a control signal to each of said lines in the corresponding assigned time slot, means for presetting said pair of lines to transmit said control signal to said delay means, means responsive to receipt of said control signal from one of said pair of lines for inserting the identity of the other one of said pair of lines in said delay means in the particular time slot assigned to said one of said pair of lines and means operative upon the appearance of said particular time slot at an output of said delay means for applying connecting signals to said pair of lines.

19. A communication system comprising a plurality of lines, transmission means, and means for establishing a connection between a pair of said lines via said transmission means comprising delay means circulating information in a repetitive cycle of time slots, each time slot being assigned to a corresponding one of said lines, means connected to said delay means for applying a control signal to each of said lines in the corresponding assigned time slot, means for presetting said pair of lines to transmit said control signal to said delay means, means responsive to receipt of said control signal from one of said pair of lines for inserting the identity of the other one of said pair of lines in said delay means in the particular time slot assigned to said one of said pair of lines and means operative upon the appearance of said particular time slot at an output of said delay means for applying connecting signals to said pair of lines and further comprising means for inserting a transmission mark in the time slot assigned to one of said pair of lines, said signal applying means responding only to the presence of said transmission mark in the time slot appearing on said delay line output.

20. A communication system comprising a plurality of lines, transmission means, and means for establishing a connection between a pair of said lines via said transmission means comprising delay means circulating information in a repetitive cycle of time slots, each time slot being assigned to a corresponding one of said lines, means connected to said delay means for applying a control signal to each of said lines in the corresponding assigned time slot, means for presetting said pair of lines to transmit said control signal to said delay means, means responsive to receipt of said control signal from one of said pair of lines for inserting the identity of the other one of said pair of lines in said delay means in the particular time slot assigned to said one of said pair of lines and means operative upon the appearance of said particular time slot at an output of said delay means for applying connecting signals to said pair of lines and further comprising clock means providing system timing signals, means enabled by said clock means to count said time slots, the output of said time slot counting means designating the line assigned to the corresponding time slot, and means for synchronizing said clock means with said delay means comprising means for applying a clock enabling signal to said delay means at the beginning of a time slot cycle, means operative upon completion of the cyclic count by said time slot counting means for inhibiting said clock means, and means for connecting the output of said delay means to said clock means to permit the clock enabling signal to reenable said clock means.

21. A communication system in accordance with claim 20 and further comprising means enabled by the output of said time slot counting means for scanning said lines for service requests, a plurality of number registers, means operative upon receipt by said scanning means of a service request from a calling line for locating an idle one of said number registers, means for storing the designation of the calling line in said idle number register and means operative thereafter for releasing said scanning means to process subsequent service request.

22. A communication system in accordance with claim 21, wherein said inserting means comprises first and second write registers, means for storing said transmission mark in said first register, means operative upon readout of a corresponding designation from said time slot counting means for storing the calling line designation in said first write register and for storing the idle register designation in said second write register and means operative concurrent with the storage of the idle register designation for transmitting the calling line designation from said first write register to said delay line.

23. A communication system in accordance with claim 22, wherein said inserting means further comprises means operative upon readout of the calling line designation from the time slot counting means during the next succeeding cycle for transmitting the idle register designation from the second write register to said delay means.

24. A communication system comprising a plurality of lines, means for scanning said lines in sequence, a calling number register, a plurality of call registers, a word counter generating the designation of each of said lines and registers in a corresponding discrete time interval of a repetitive cycle of time intervals, means responsive to a request for service for storing the current content of said word counter in said calling number register and for selecting an idle one of said call registers, means operated by said word counter for storing data for cyclical readout in said time intervals, means for inserting the identity of the calling line in said data storing means in a first time slot assigned to said selected call register, means for inserting the identity of said selected call register in said data storing means in a second time slot assigned to said calling line and means enabled by outputs of said data storing means in said second time slot for engaging said selected call register to supervise the establishment of a connection bewteen said calling line and a called one of said lines.

25. A communication system in accordance with claim 24, further comprising means for inserting the identity of said called line in said data storing means in said second time slot and means enabled by outputs of said data storing means and of said word counter in one of said first and second time slots for interconnecting said calling and called lines in each repetitive cycle.

26. A telephone system comprising a plurality of lines, means for interrogating each line in sequence in a corresponding discrete time slot of a repetitive cycle of time slots, a calling number register, means operative upon detection of a service request for stopping the line interrogation and for recording the identity of the time slot in which the request is received in said calling number register, a call register terminating one of said lines, means for transferring the recorded identity of the calling line from the calling number register to said call register, means for storing the identity of said call register in the time slot assigned to the calling line, and means for storing the identity of the calling line in the time slot assigned to the selected call register.

27. A telephone system in accordance with claim 26, further comprising means controlled by said interrogating means and by said storing means for connecting the calling line to the selected call register during at least one of said assigned time slots in each subsequent cycle of time slots.

28. A telephone system in accordance with claim 27, further comprising a called number register and means operative upon activation of the call register for storing called line identifying pulses provided by said calling line in said called number register.

29. A telephone system in accordance with claim 28, further comprising means operative upon registration of the called line designation in the called number register for matching the called line designation against the designations stored in each time slot in sequence.

30. A telephone system in accordance with claim 29, further comprising means operative upon failure to achieve a match between the called line designation and the designation stored in any time slot for connecting the calling line to the called line, said connecting means comprising means for storing the called line designation in the time slot assigned to the calling line and for storing the calling line designation in the time slot assigned to the called line.

31. A telephone system in accordance with claim 30 further comprising a transmission bus common to said plurality of lines and means operative upon each retrieval of said called line designation from said storing means for connecting said calling line to said called line via said transmission bus.

32. A telephone system in accordance with claim 29, further comprising a busy tone source terminating one of said lines and means operative upon achieving a match between said called line designation and the designation stored in one of said time slots for connecting said busy tone source to the calling line, comprising means for storing the identity of the calling line in the time slot assigned to the busy tone line and means for storing the identity of the busy tone line in the time slot assigned to the calling line.

33. A communication system comprising a plurality of communication paths, network means for establishing communication connections between said paths, and time division means distinct from said communication connection means for providing supervisory signaling for said communication connections, said last-mentioned means comprising a data exchange circuit means associated with said data exchange circuit for applying a control signal to each of said paths in corresponding assigned time slots of a repetitive cycle, means for transmitting said control signals from said paths to said data exchange circuit, and means responsive to receipt of said control signal in said data exchange circuit from one of said paths in the corresponding assigned time slot for enabling another one of said paths for supervisory signaling.

34. A communication system in accordance with claim 33, wherein said network means comprises a space division network.

35. A communication system in accordance with claim 33, wherein said network means comprises a time division network.

References Cited

UNITED STATES PATENTS

| | | | |
|---|---|---|---|
| 2,917,583 | 12/1959 | Burton et al. | 179—18 |
| 3,223,784 | 12/1965 | Inose et al. | 179—18 |
| 3,271,521 | 9/1966 | Von Sanden et al. | 179—15 |

KATHLEEN H. CLAFFY, Primary Examiner

A. B. KIMBALL, Jr., Assistant Examiner

U.S. Cl. X.R.

179—15